(12) United States Patent
Kreutzer et al.

(10) Patent No.: US 10,445,361 B2
(45) Date of Patent: Oct. 15, 2019

(54) CACHING OF SUBGRAPHS AND INTEGRATION OF CACHED SUBGRAPHS INTO GRAPH QUERY RESULTS

(71) Applicant: Microsoft Technology Licensing, LLC, Redmond, WA (US)

(72) Inventors: Tor Kreutzer, Tromso (NO); Åge Kvalnes, Tromso (NO); Steffen Viken Valvåg, Tromso (NO); Amund Kronen Johansen, Tromso (NO); Dag Steinnes Eidesen, Tromso (NO); Peter Dahle Heen, Tromso (NO); Jan-Ove Almli Karlberg, Tromso (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 238 days.

(21) Appl. No.: 15/399,989

(22) Filed: Jan. 6, 2017

(65) Prior Publication Data
US 2018/0173727 A1    Jun. 21, 2018

Related U.S. Application Data

(60) Provisional application No. 62/435,068, filed on Dec. 15, 2016.

(51) Int. Cl.
  *G06F 16/532*    (2019.01)
  *G06F 16/901*    (2019.01)
  *G06F 12/0893*    (2016.01)

(52) U.S. Cl.
  CPC ........ *G06F 16/532* (2019.01); *G06F 12/0893* (2013.01); *G06F 16/9024* (2019.01)

(58) Field of Classification Search
  CPC ......... G06F 17/30277; G06F 17/30958; G06F 12/0893; G06F 2212/302; G06F 16/532; G06F 16/9024
  See application file for complete search history.

(56) References Cited

U.S. PATENT DOCUMENTS 6,397,206 B1 *  5/2002  Hill ................... G06F 17/30463
                                                      707/713
6,427,234 B1 *  7/2002  Chambers ........... G06F 9/45516
                                                      717/140
(Continued)

FOREIGN PATENT DOCUMENTS

EP    3016004 A1     5/2016
WO    2011151500 A1  12/2011

OTHER PUBLICATIONS

"Getting Started with IBM Graph", Retrieved From: https://ibm-graph-docs.ng.bluemix.net/gettingstarted.html, Retrieved Date: Aug. 9, 2016, 9 Pages.

(Continued)

*Primary Examiner* — James Trujillo
*Assistant Examiner* — Hubert Cheung
(74) *Attorney, Agent, or Firm* — Merchant & Gould

(57) ABSTRACT

Systems, methods, and computer readable devices embodying instructions are provided herein for reducing latencies and/or improving computational efficiency when traversing data stored in a relational graph by caching subgraphs and enabling the utilization thereof. More specifically, after a user performs a graph query, the resulting subgraphs of the graph query are cached in a reusable form. Subsequent graph queries are able to identify cached subgraphs based on the graph query. Further, the subsequent graph query is operable to integrate the cached subgraphs as part of the result of subsequent graph query, which may include a portion or the entire result of the subsequent graph query being composed from cached subgraphs, thereby improving the computational efficiency and performance of querying relational graphs, reducing the query execution cost required to traverse the relational graphs, and improving the functionality (Continued)

of the computing devices hosting the relational graphs and running the queries.

20 Claims, 8 Drawing Sheets

(56) References Cited

U.S. PATENT DOCUMENTS

| | | | |
|---|---|---|---|
| 6,556,983 B1* | 4/2003 | Altschuler | G06F 17/30958 706/11 |
| 7,363,299 B2 | 4/2008 | Dalvi et al. | |
| 7,424,498 B1 | 9/2008 | Patterson | |
| 7,899,861 B2* | 3/2011 | Feblowitz | G06F 8/34 709/201 |
| 8,086,598 B1* | 12/2011 | Lamb | G06F 17/30466 707/606 |
| 8,156,129 B2 | 4/2012 | Zhou et al. | |
| 8,321,430 B2 | 11/2012 | Zvi et al. | |
| 8,326,847 B2 | 12/2012 | Balmin et al. | |
| 8,423,538 B1 | 4/2013 | Sadikov et al. | |
| 8,819,078 B2 | 8/2014 | Roy et al. | |
| 9,071,533 B2 | 6/2015 | Hui et al. | |
| 9,092,481 B2 | 7/2015 | Digana | |
| 9,141,727 B2* | 9/2015 | Arikuma | G06F 16/316 |
| 9,158,847 B1 | 10/2015 | Majumdar | |
| 9,244,983 B2 | 1/2016 | Yang et al. | |
| 9,348,880 B1 | 5/2016 | Kramer et al. | |
| 9,367,880 B2 | 6/2016 | Raina et al. | |
| 9,378,241 B1* | 6/2016 | Shankar | G06F 17/30395 |
| 9,626,407 B2 | 4/2017 | Behal et al. | |
| 2005/0175245 A1 | 8/2005 | Sutanto et al. | |
| 2006/0064432 A1 | 3/2006 | Pettovello | |
| 2007/0174309 A1 | 7/2007 | Pettovello | |
| 2007/0282470 A1 | 12/2007 | Hernandez et al. | |
| 2008/0243770 A1 | 10/2008 | Aasman | |
| 2008/0294615 A1* | 11/2008 | Furuya | G06F 17/3046 |
| 2009/0300002 A1 | 12/2009 | Thomas et al. | |
| 2010/0036835 A1 | 2/2010 | Stergiou et al. | |
| 2010/0211924 A1 | 8/2010 | Begel et al. | |
| 2010/0268722 A1 | 10/2010 | Yalamanchi et al. | |
| 2011/0246439 A1 | 10/2011 | Isard et al. | |
| 2011/0295841 A1 | 12/2011 | Sityon et al. | |
| 2011/0296517 A1 | 12/2011 | Grigoriev et al. | |
| 2012/0047114 A1 | 2/2012 | Duan et al. | |
| 2012/0047149 A1 | 2/2012 | Zhou et al. | |
| 2012/0158636 A1 | 6/2012 | Bowers et al. | |
| 2012/0303627 A1 | 11/2012 | Keeton et al. | |
| 2013/0110876 A1 | 5/2013 | Meijer et al. | |
| 2013/0179467 A1* | 7/2013 | Ain | G06F 17/30979 707/771 |
| 2013/0204903 A1 | 8/2013 | Hao et al. | |
| 2013/0232452 A1 | 9/2013 | Krajec et al. | |
| 2013/0246454 A1 | 9/2013 | Menten | |
| 2013/0275410 A1* | 10/2013 | Atedgi | G06F 17/30958 707/722 |
| 2014/0067781 A1 | 3/2014 | Wolchok et al. | |
| 2014/0067791 A1 | 3/2014 | Idicula et al. | |
| 2014/0068533 A1* | 3/2014 | Goswami | G06F 17/5022 716/108 |
| 2014/0136520 A1 | 5/2014 | Digana | |
| 2014/0136553 A1 | 5/2014 | Jacob et al. | |
| 2014/0164347 A1 | 6/2014 | Jeh et al. | |
| 2014/0172914 A1 | 6/2014 | Elnikety et al. | |
| 2014/0250047 A1 | 9/2014 | Bounouane et al. | |
| 2014/0278590 A1* | 9/2014 | Abbassi | G06Q 30/0283 705/5 |
| 2014/0324864 A1* | 10/2014 | Choe | G06F 17/30823 707/737 |
| 2014/0330818 A1 | 11/2014 | Raina et al. | |
| 2014/0337317 A1 | 11/2014 | Woss et al. | |
| 2014/0365503 A1 | 12/2014 | Franceschini et al. | |
| 2015/0081741 A1 | 3/2015 | Xu | |
| 2015/0106324 A1 | 4/2015 | Puri et al. | |
| 2015/0169758 A1* | 6/2015 | Assom | G06F 17/30958 707/603 |
| 2015/0193636 A1 | 7/2015 | Snelling | |
| 2015/0220530 A1* | 8/2015 | Banadaki | G06F 17/30943 707/723 |
| 2015/0234936 A1 | 8/2015 | Hu et al. | |
| 2015/0242402 A1 | 8/2015 | Holm et al. | |
| 2015/0248487 A1 | 9/2015 | Baranowski et al. | |
| 2015/0310129 A1 | 10/2015 | Ushijima | |
| 2015/0317360 A1 | 11/2015 | Ngai et al. | |
| 2015/0324410 A1 | 11/2015 | Glover | |
| 2015/0363461 A1 | 12/2015 | Behal et al. | |
| 2015/0363705 A1 | 12/2015 | Moore et al. | |
| 2015/0370919 A1 | 12/2015 | Bomhoevd et al. | |
| 2016/0034462 A1 | 2/2016 | Brewer | |
| 2016/0055311 A1 | 2/2016 | Buchanan et al. | |
| 2016/0063017 A1 | 3/2016 | Bartlett et al. | |
| 2016/0092350 A1 | 3/2016 | Rajanna et al. | |
| 2016/0110134 A1 | 4/2016 | Rao et al. | |
| 2016/0117358 A1 | 4/2016 | Schmid et al. | |
| 2016/0148093 A1 | 5/2016 | Adderly et al. | |
| 2016/0189218 A1 | 6/2016 | Kota | |
| 2016/0203327 A1 | 7/2016 | Akkiraju et al. | |
| 2017/0206276 A1* | 7/2017 | Gill | G06F 16/9535 |
| 2017/0364539 A1* | 12/2017 | Jacob | G06F 16/25 |
| 2018/0039696 A1* | 2/2018 | Zhai | G06F 17/30669 |
| 2018/0053327 A1* | 2/2018 | Contractor | G06T 11/206 |
| 2018/0096035 A1 | 4/2018 | Kreutzer et al. | |
| 2018/0113950 A1 | 4/2018 | Blanchflower | |
| 2018/0121482 A1 | 5/2018 | Heen et al. | |
| 2018/0173760 A1 | 6/2018 | Viken valvag et al. | |
| 2018/0247073 A1 | 8/2018 | Kreutzer et al. | |
| 2019/0171840 A1 | 6/2019 | Kreutzer et al. | |

OTHER PUBLICATIONS

"Quotient Filter", Retrieved From: https://en.wikipedia.org/w/index.php?title=Quotient_filter&oldid=720907087, May 18, 2016, 6 Pages.

"Non Final Office Action Issued in U.S. Appl. No. 15/282,718", dated Oct. 9, 2018, 16 Pages.

Cheng, et al., "Fast Graph Query Processing with a Low-Cost Index", In the Very Large Data Bases Journal, vol. 20, Issue 4, Aug. 2011, pp. 521-539.

Fan, et al., "Cuckoo Filter", Retrieved From: https://github.com/efficient/cuckootilter, Jan. 15, 2016, 2 Pages.

Gomes-Jr, et al., "Beta-Algebra: Towards a Relational Algebra for Graph Analysis", In Proceedings of the Workshops of the EDBT/ICDT 2015 Joint Conference, Mar. 27, 2015, pp. 157-162.

Gomes-Jr, et al., "Querying and Managing Complex Data", In Proceedings of the 18th East European Conference on Advances in Databases and Information Systems and Associated Satellite Events, Sep. 7, 2014, pp. 317-321.

Somes-Jr, et al., "Towards Query Model Integration: Topology-Aware, IR-Inspired Metrics for Declarative Graph Querying", In Proceedings of the Joint 2013 EDBT/ICDT Conferences, Mar. 22, 2013, pp. 185-194.

Hintsanen, et al., "Finding Reliable Subgraphs from Large Probabilistic Graphs", In Journal of Data Mining and Knowledge Discovery, vol. 17, Issue 1, Aug. 2008, pp. 3-23.

Hunger, Michael, "Querying Graphs with Neo4j", Retrieved From: https://dzone.com/refcardz/querying-graphs-neo4j, Nov. 6, 2015, 26 Pages.

Jindal, et al., "GRAPHiQL: A Graph Intuitive Query Language for Relational Databases", In Proceedings of IEEE International Conference on Big Data, Oct. 27, 2014, pp. 441-450.

Kim, et al., "Retrieving Keyworded Subgraphs with Graph Ranking Score", In Journal of Expert Systems with Applications, vol. 39, Issue 5, Apr. 2012, pp. 4647-4656.

Liptchinsky, et al., "Expressive Languages for Selecting Groups from Graph-Structured Data", In Proceedings of the 22nd International World Wide Web Conference, May 13, 2013, pp. 761-770.

Niu, Yin, "Introduction to Probabilistic Data Structures", Retrieved From: https://dzone.com/articles/introduction-probabilistic-0, Apr. 30, 2015, 26 Pages.

(56) References Cited

OTHER PUBLICATIONS

"International Search Report and Written Opinion Issued in PCT Application No. PCT/US2017/053856", dated Nov. 23, 2017, 12 Pages.
"International Search Report and Written Opinion Issued in PCT Application No. PCT/US2017/057775", dated Jan. 23, 2018, 13 Pages.
"International Search Report and Written Opinion Issued in PCT Application No. PCT/US2018/019072", dated Jul. 10, 2018, 22 Pages.
Rest, et al., "PGQL: A Property Graph Query Language", In Proceedings of the Fourth International Workshop on Graph Data Management Experience and Systems, Jun. 24, 2016, 6 Pages.
Shao, et al., "Trinity", Retrieved From: https://www.microsoft.com/en-us/research/project/trinity/, Oct. 30, 2010, 6 Pages.
Wood, Peter T., "Query Languages for Graph Databases", In Journal of SIGMOD Record, vol. 41, Issue 1, Mar. 2012, pp. 50-60.
Zervakis, et al., "Towards Publish/Subscribe Functionality on Graphs", In Proceedings of the Workshops of the EDBT/ICDT Joint Conference, Mar. 15, 2016, 4 Pages.
Fard, et al., "Effective Caching Techniques for Accelerating Pattern Matching Queries", In Proceedings of IEEE International Conference on Big Data, Oct. 27, 2014, 9 pages.
Papailiou, et al., "Graph-Aware, Workload-Adaptive SPARQL Query Caching", In Proceedings of the ACM SIGMOD International Conference on Management of Data, May 31, 2015 16 pages.
Hassan, et al., "Graph Indexing for Shortest-Path Finding over Dynamic Sub-Graphs", In Proceedings of International Conference on Management of Data, Jun. 26, 2016, 15 pages.
Gai, et al., "An Efficient Summary Graph Driven Method for RDF Query Processing", https://arxiv.org/pdf/1510.07749.pdf, Retrieved on: Oct. 17, 2016, 12 pages.
"International Search Report and Written Opinion Issued in PCT Application No. PCT/US2017/065214", dated Feb. 8, 2018, 12 Pages.
"Non Final Office Action Issued in U.S. Appl. No. 15/399,975", dated Dec. 19, 2018, 11 Pages.
"Notice of Allowance Issued in U.S Appl. No. 15/399,975", dated Apr. 17, 2019, 12 Pages.
"Final Office Action Issued in U.S. Appl. No. 15/282,718", dated Mar. 11, 2019, 13 Pages.
"Non Final Office Action Issued in U.S. Appl. 15/338,290", dated May 30, 2019, 13 Pages.

* cited by examiner

CACHING OF SUBGRAPHS AND INTEGRATION OF CACHED SUBGRAPHS INTO GRAPH QUERY RESULTS

RELATED APPLICATION

This application claims benefit of U.S. Provisional Patent Application No. 62/435,068 titled "CACHING OF SUBGRAPHS AND INTEGRATION OF CACHED SUBGRAPHS INTO GRAPH QUERY RESULTS" filed on Dec. 15, 2016, the entirety of which is hereby incorporated by reference.

BACKGROUND

In a graph database, entities are presented as nodes and relationships between those entities are presented as edges in a view of the relational graph maintained by the graph database. The relational graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, etc. The graph query produces a subgraph of the queried graph database that satisfies the query. Further, it is not uncommon for a graph query to start at a node, then follow some set of relationships to a new set of nodes, before again expanding along a new set of relationships to yet another set of nodes. The number of expansion levels is open, and as the complexity of the queries and the size of the graph database increase, the cost of having to span the entire subgraph for every query might become prohibitively large.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable devices embodying instructions are provided herein for reducing latencies and/or improving computational efficiency when traversing data stored in a relational graph by caching subgraphs and enabling the utilization of the cached subgraphs. More specifically, after a user performs a graph query, the resulting subgraphs of the graph query are cached in a reusable form. Subsequent graph queries are able to identify cached subgraphs based on the graph query. Further, the subsequent graph query is operable to integrate the cached subgraphs as part of the result of subsequent graph query, which may include a portion or the entire result of the subsequent graph query being composed from cached subgraphs, thereby allowing the system to leap graph query execution directly to the fringe of said cached subgraphs.

Accordingly, caching subgraphs and the integration of cached subgraphs into graph query results provides improvements to the computational efficiency and performance of querying relational graphs, reduces the query execution cost required to traverse the relational graphs, and thereby improves the functionality of the computing devices hosting the relational graphs and running the queries.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
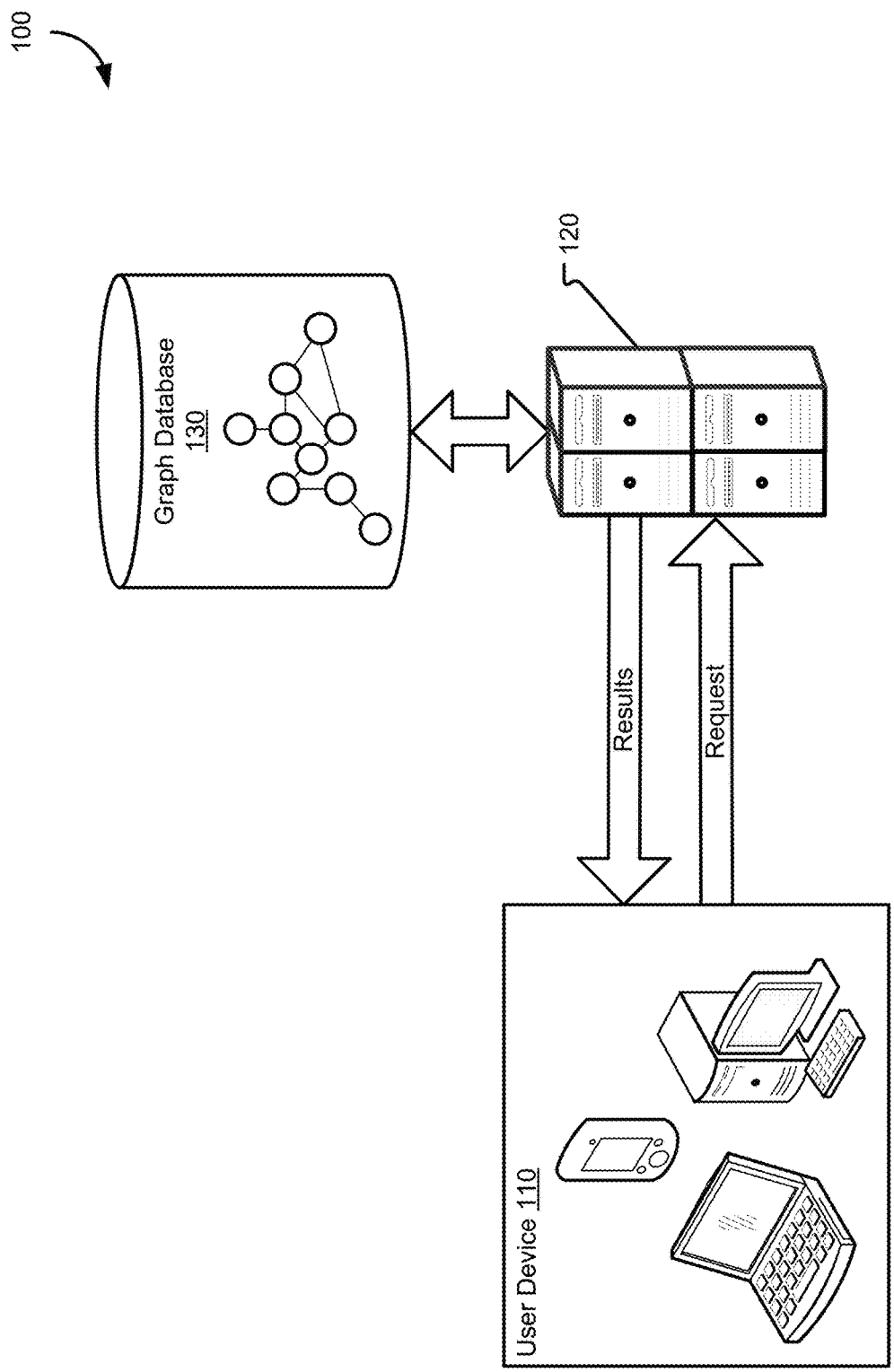
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable devices embodying instructions are provided herein for reducing latencies and/or improving computational efficiency when traversing data stored in a relational graph by caching subgraphs and enabling the utilization of the cached subgraphs. More specifically, after a user performs a graph query, the resulting subgraphs of the graph query are cached in a reusable form. Subsequent graph queries are able to identify cached subgraphs based on the graph query. Further, the subsequent graph query is operable to integrate the cached subgraphs as part of the result of subsequent graph query, which may include a portion or the entire result of the subsequent graph query being composed from cached subgraphs, thereby allowing the system to leap graph query execution directly to the fringe of said cached subgraphs.

Accordingly, caching subgraphs and the integration of cached subgraphs into graph query results provides improvements to the computational efficiency and performance of querying relational graphs, reduces the query execution cost required to traverse the relational graphs, and thereby improves the functionality of the computing devices hosting the relational graphs and running the queries.

FIG. 1 illustrates an example environment 100 in which the present disclosure may be practiced. A user device 110 is in communication with a graph server 120, which maintains a relational graph in a graph database 130. A relational graph maintains several entities as nodes and the relationships between those nodes as edges connecting related nodes, and the graph database 130 is operable to store one or more relational graphs and subgraphs thereof for the user device 110 to query. Further, subgraphs from previous graph queries are cached for subsequent retrieval. In response to receiving a graph query, relevant cached subgraphs are identified based on the query information and the relevant cached subgraphs are integrated into the results for the graph query. The results of the request are then transmitted back to the user device 110.

The user device 110 and graph server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A and 6B and 7. User devices 110 are operated by users, who may be humans or automated systems (e.g., "bots"). In various aspects, the user device 110, and graph server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The graph server 120 hosts a graph database 130 of a relational graph with nodes describing entities and a set of accompanying properties of those entities, such as, for example, the names, titles, ages, addresses, etc. Each property can be considered a key/value pair—a name of the properties and its value. In other examples, entities represented as nodes that include documents, meetings, communication, etc., as well as edges representing relations among these entities, such as an edge between a person node and a document node representing that person's authorship, modification, or view of the document.

The graph server 120 executes graph queries that are submitted by various users. The graph server 120 is also operable to access the graph structure description, which resides in the graph database 130, which may include, in various aspects: a relational database, a NoSQL database, or any other database. Subgraphs or views of the relational graph are stored in the graph database 130 for subsequent graph queries for the same metrics in various aspects. In some aspects, when the graph server 120 produces a subgraph in response to a graph query, the graph server 120 checks whether a cached subgraph that will satisfy the graph query exists in the graph database 130, and will produce that subgraph by retrieving it from the graph database 130, otherwise the graph server 120 will produce the subgraph by executing the graph query, and cache the resulting subgraph for later retrieval.

Figure 2:
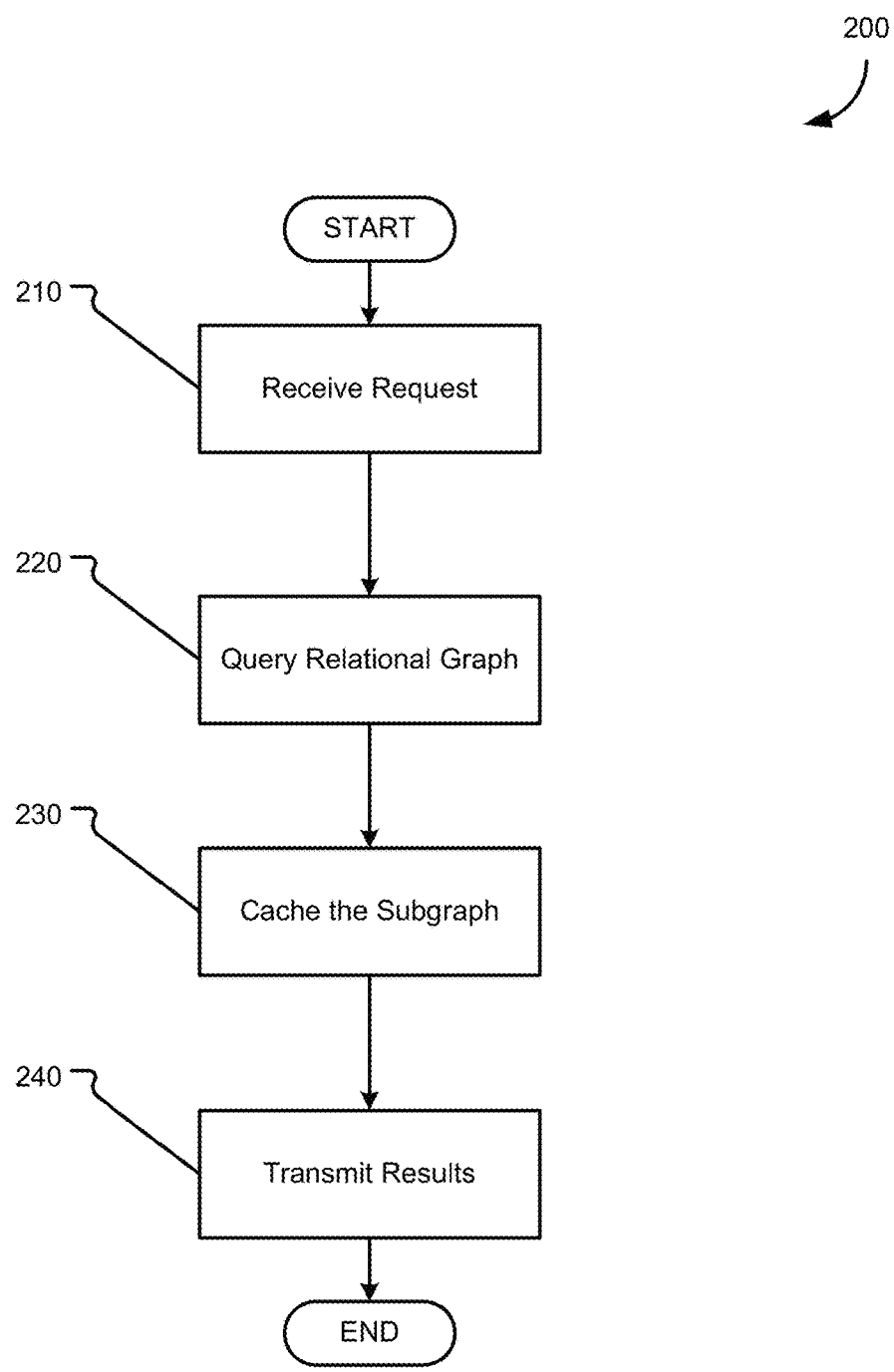
FIG. 2 is a flow chart showing general stages involved in an example method for implementing caching subgraphs.

FIG. 2 is a flow chart showing general stages involved in an example method 200 for implementing caching subgraphs. Method 200 begins at OPERATION 210, where the graph server 120 receives a request for a view of a hosted relational graph. In various aspects the request is a query of the relational graph. For example, a user of a user device 110 may transmit a request to a graph server 120 hosting a relational graph describing an organizational structure, including nodes corresponding to "users", "buildings", and "projects", relationships between users such as "manager_of", relationships between users and buildings such as "works_in", and relationships between users and projects such as "works_on". These nodes have properties such as name, title, address, etc. In one example, the query requests information for persons who are listed as managers (a query of the nodes) in the relational graph.

Proceeding to OPERATION 220, the query is used to access a view of the relational graph. In various aspects, the view of the relational graph may be created in response to the query. To illustrate a query, consider the example shown in CODE 1. In CODE 1, a query that is part of a request for the names of persons in an organization who "Alice" is a "manager of" may be formatted as shown. In different aspects the query may be formatted according to different query languages that access the relational graphs and subgraphs thereof, and one of ordinary skill in the art will be familiar with the relevant query languages, which include, but are not limited to: Cypher, FQL (Facebook Query Language), and SQL (Structured Query Language). The query shown in CODE 1 requests the entities from the relational graph that has a property that matches the argument of "Alice" and "manager of" and returns results with the names of those entities as either a list or as a view (e.g., a subgraph) of the relational graph that was queried.

CODE 1: MATCH (a:USER {name:"Alice"})-[r:MANAGER_OF]->(u:USER)
RETURN u.name

At OPERATION 230 the subgraph is cached. According to one aspect, the subgraph is cached to the graph server 120 for later access by subsequent queries. With respect to the example, when this query is executed, the resulting subgraph, i.e. the nodes corresponding to Alice and her directs and the edges between them, is cached for future use. Unless the results have been invalidated, the subgraph can be used directly the next time the same query arrives at the graph server 120.

At OPERATION 240, the results of the query are transmitted to the user device 110 that submitted the request received in OPERATION 210. In various aspects, the results may be transmitted as a view of the relational graph, a sub-graph, or as another format of data. With respect to CODE 1, the results of the query identifies the USER node for "Alice" and the MANAGER_OF edges that identify persons that Alice directs. Method 200 may then conclude.

In another example of FIG. 2 showing general stages involved in an example method 200 for implementing caching subgraphs. Method 200 begins at OPERATION 210, where the graph server 120 receives a query for a view of a hosted relational graph.

Proceeding to OPERATION 220, the query is used to access a view of the relational graph. To illustrate a query, consider the example shown in CODE 2. In CODE 2, a query that is part of a request for the names of persons in an organization who work in the same building as Alice. The query shown in CODE 2 requests the entities from the relational graph that have a property that matches the argument of "Alice" and "works in" and returns results with the names of those entities as either a list or as a view (e.g., a subgraph) of the relational graph that was queried.

CODE 2: MATCH (a:USER {name:"Alice"})-[r1:WORKS_IN]->(b:BUILDING)<-[r2:WORKS_IN]-(u:USER)
RETURN u.name At OPERATION 230 the subgraph is cached. According to one aspect the subgraph is cached to the graph server 120 for later access by subsequent queries.

At OPERATION 240, the results of the query are transmitted to the user device 110. With respect to CODE 1, the results of the query identifies the USER node for "Alice" and the WORKS_IN edges that identify persons that work in the same building. Method 200 may then conclude.

While the examples CODE 1 and CODE 2 above relate to "Alice," it should also be noted that subgraph caching is also useful for answering queries originating from different users. Specifically, if the previously described graph describes a large organization, it is likely that the manager hierarchy contains multiple levels. For example, if "Paul" is the CEO, Paul has multiple users reporting to him, one of whom is "Joe". Joe also manages many users, and several links down the manager chain is Alice and "Maria" is one of the users Alice manages. Accordingly, one query for a user's manager chain is shown in CODE 3.

CODE 3: MATCH (u:USER {name:"username"})<-[:MANAGER_OF*]-(m:USER)
RETURN m.name

In the example CODE 3, the asterisk indicates that there can be multiple levels of "manager_of" relationships. As such, if Joe executes the query, with "Joe" as the username, the resulting subgraph would be the two nodes corresponding to Joe and Paul, and the "manager_of" edge linking the two. Next, Alice queries for her manager chain. If subgraph caching is not utilized, this would result in following the edges from Alice to her manager, from her manager to the next manager, and so on until Paul is finally hit and the query terminates. However, if subgraph caching is utilized, the cached subgraph from Joe's previous query is used when Alice's query hits the portion of the relational graph already spanned by Joe's query that is cached as a subgraph. Further, if Maria queries for her manager chain, the only work necessary is following a single edge to Alice and the rest of the manager chain is cached and can be used to answer the query.

Figure 3:
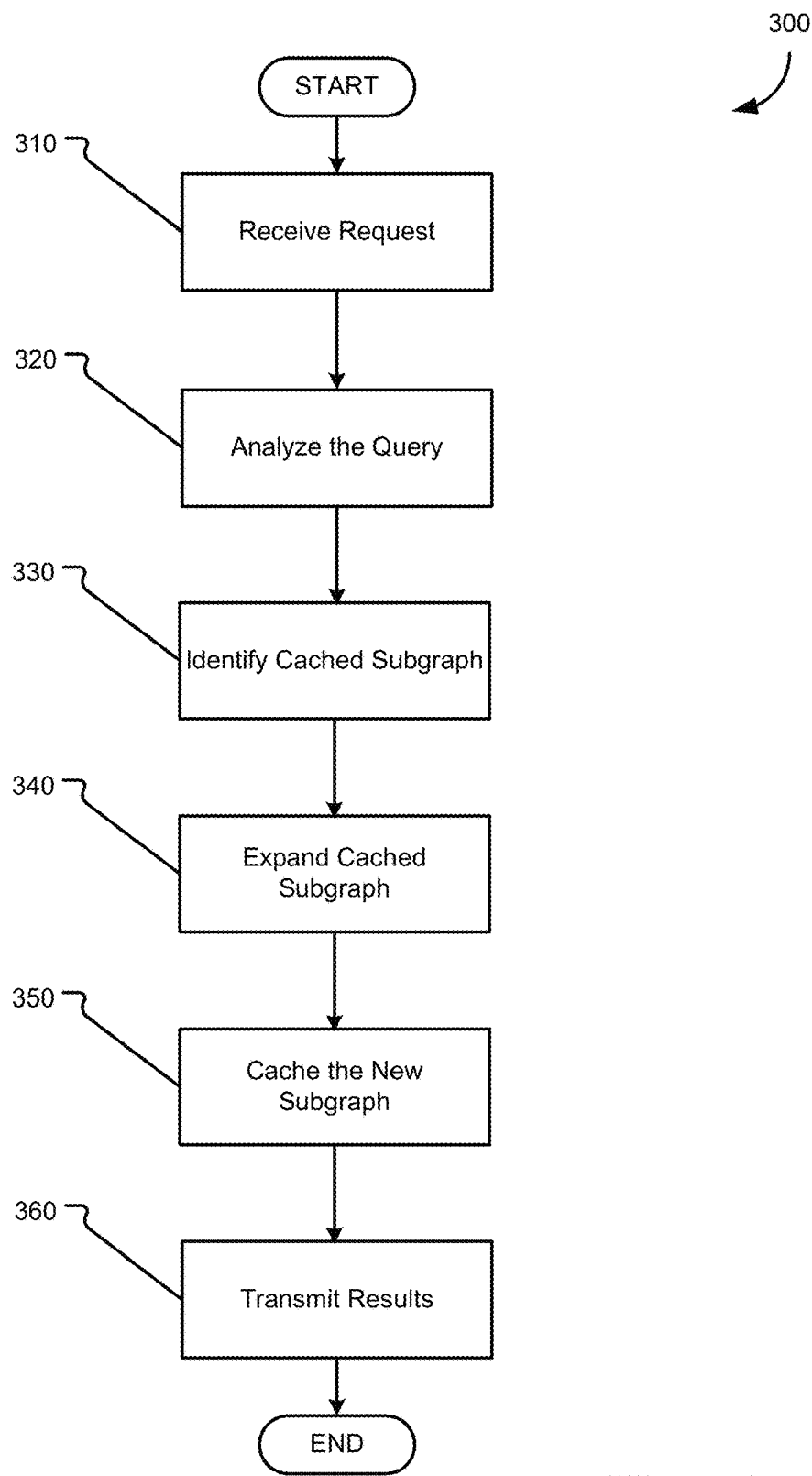
FIG. 3 is a flow chart showing general stages involved in an example method for integrating cached subgraphs into graph query results.

FIG. 3 is a flow chart showing general stages involved in an example method 300 for integrating cached subgraphs into graph query results. For example, the example method 300 may occur after example method 200 in FIG. 2 has occurred and the previous subgraph has been cached.

Method 300 begins at OPERATION 310, where the graph server 120 receives a request for a view of a hosted relational graph. In various aspects the request is a query of the relational graph. To illustrate a query, consider the example shown in CODE 4. In CODE 4, a query that is part of a request for the names of persons in an organization who "Alice" is a "manager of" and "works on" a particular project may be formatted as shown. The query shown in CODE 4 requests the entities from the relational graph that have a property that matches the names and project titles of those entities as either a list or as a view (e.g., a subgraph) of the relational graph that was queried.

CODE 4: MATCH (a:USER {name:"Alice"})-[r:MANAGER_OF]->(u:USER)-[:WORKS_ON]->(p:PROJECT)
RETURN u.name, p.title At OPERATION 320 the query is analyzed for information that identifies cached subgraphs. According to one aspect, cached subgraphs include a characteristic that identifies information regarding a previous query associated with the cached subgraph.

For example, the previously cached subgraphs may cache the raw intermediary data structures used when executing the graph traversals. Accordingly, in one example, when a query arrives, it is parsed and transformed to an Abstract Syntax Tree (AST). The matches on the AST level allow reuse of the cached subgraph, but remove any restrictions on the formulation of queries. Thus, by using a suitable data structure for the cached subgraphs, the graph server 120 recognizes a subgraph pattern on the AST level and then loads a cached intermediate data structure corresponding to that subgraph pattern. These data structures may be used to directly execute the next step of the graph traversal. Specifically, for each node in the intermediary data structure for the query, the cache key corresponding to the node identifier and the partial AST is generated and the cache queried. Thus, the query is analyzed to identify any initial anchoring node(s). With reference to CODE 4, the relevant anchoring node(s) may include a USER node for "Alice."

At OPERATION 330 the graph server 120 identifies any relevant cached subgraph that relates to the characteristic. Any identified cached subgraph may include results that are relevant to a portion of the query or the entire query. According to one aspect, when executing a query/graph traversal, the cache is queried for every node that is visited. As such, node identifiers are part of the keys used when querying the cache; however, a node identifier alone is not sufficient as multiple subgraphs can be cached for each node in the graph. For example, the graph server 120 may utilize a tuple including the root node identifier and a hash of the subgraph AST as the cache key, which allows efficient constant time lookups towards the cache. Further, if the underlying graph structure is read only, no invalidation of the cache is necessary. However, if the graph is non-static, all subgraphs affected by a change to the underlying graph are invalidated. In accordance with one example, for each anchoring node, a cache key is generated and the cache is queried. If a cache miss occurs, the edges from that node (subject to the query constraints) are traversed and the nodes reached by this traversal are inserted into the intermediary data structures used by the traversal engine. However, if the cache yields a hit, the cached subgraph for this node can be returned. With reference to CODE 1, the cached subgraph may identify the USER node for "Alice" and the MANAGER_OF edges that identify persons that Alice directs.

According to various aspects, the graph server 120 utilizes subgraph pattern recognition to identify any relevant cached subgraphs. In one example, the subgraph pattern recognition is implemented using exact matching on the query string. Using an exact matching for subgraph pattern recognition allows the reuse of cached subgraphs when an exact match of a query is identified, but does not permit composition of subgraphs. Accordingly, in another example, the subgraph pattern recognition is implemented using substring matching on the query string. Using substring matching for subgraph pattern recognition allows the reuse of cached subgraphs when an exact match of a query is identified and permits composition of subgraphs when a partial match of a query is identified.

At OPERATION 340 the graph server 120 expands the cached subgraph with the additional nodes. Accordingly, when a relevant cached subgraph relating to a portion of the query is identified, usage of the relevant cached subgraph as a starting point for expanding the cached subgraph with remaining elements of the query offers computational savings. Further, when a relevant cached subgraph corresponds to the query, identification and transmission of the cached subgraph provides significant computational savings. For example, instead of having to enumerate and traverse all MANAGER_OF edges from USER node for "Alice," the cached subgraph can be used directly as a starting point for further expansion to the PROJECT nodes. Accordingly, the cached subgraph is expanded to identify WORKS_ON edges that traverse the graph to identify the various PROJECT nodes.

At OPERATION 350 the new subgraph is cached. With respect to CODE 1, when this previous cached subgraph is expanded, the resulting subgraph, i.e. the nodes corresponding to Alice, her directs and projects and the edges between them, is cached for future use. According to one aspect the subgraph is cached to the graph server 120 for later access by subsequent queries.

At OPERATION 360, the results of the query are transmitted to the user device 110. In various aspects, the results may be transmitted as a view of the relational graph, a sub-graph, or as another format of data that answers an analytic, such as, for example, a string, an integer, a double, etc. Method 300 may then conclude.

Figure 4:
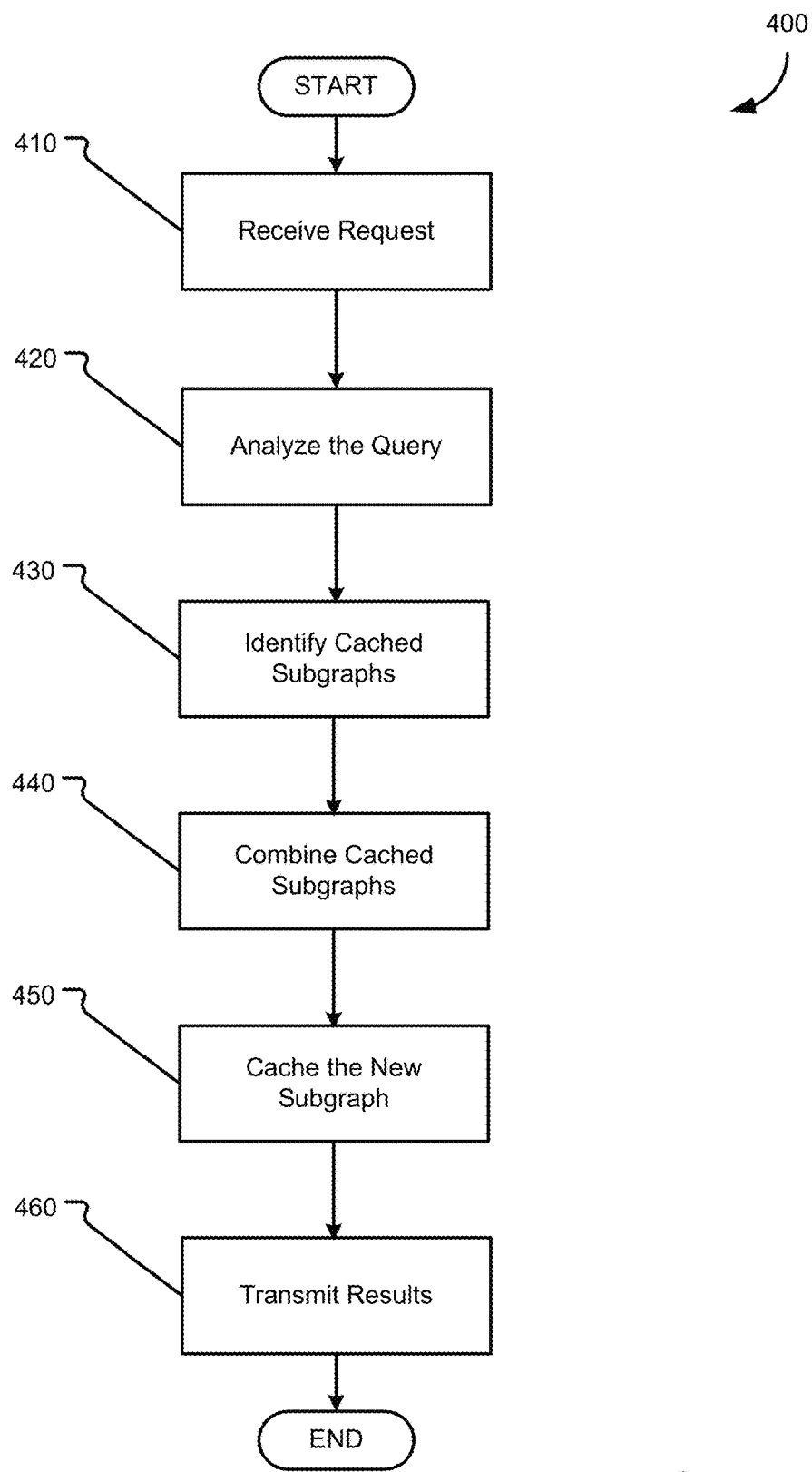
FIG. 4 is a flow chart showing general stages involved in an example method for integrating cached subgraphs into graph query results.

FIG. 4 is a flow chart showing general stages involved in an example method 400 for integrating cached subgraphs into graph query results. For example, the example method 400 may occur after example method 200 in FIG. 2 has occurred and the previous subgraph has been cached.

Method 400 begins at OPERATION 410, where the graph server 120 receives a request for a view of a hosted relational graph. In various aspects the request is a query of the relational graph. To illustrate a query, consider the example shown in CODE 5. In CODE 5, a query that is part of a request for the names of persons in an organization who "Alice" is a "manager of" and "works in" the same building as "Alice" may be formatted as shown.

CODE 5: MATCH (a:USER {name:"Alice"})-[r:MANAGER_OF]->(u:USER)-[:WORKS_ON]->(p:PROJECT)
RETURN u.name, p.title At OPERATION 420 the query is analyzed for information that identifies cached subgraphs. According to one aspect, cached subgraphs include a characteristic that identifies information regarding a previous query associated with the cached subgraph. In one example, for each node in the intermediary data structure for the query, the cache key corresponding to the node identifier and the partial AST is generated and the cache queried. Thus, the query is analyzed to identify any initial anchoring node(s).

At OPERATION 430 the graph server 120 identifies any relevant cached subgraph that relates to the characteristic. Any identified cached subgraph may include results that are relevant to a portion of the query or the entire query. In one example, for each anchoring node, a cache key is generated and the cache is queried. If a cache miss occurs, the edges from that node (subject to the query constraints) are traversed and the nodes reached by this traversal are inserted into the intermediary data structures used by the traversal engine. However, if the cache yields a hit, the cached subgraph for this node can be returned. With reference to CODE 5, the cached subgraph may identify the cached subgraphs associated with CODE 1 and CODE 2.

At OPERATION 440 the graph server 120 combines the cached subgraphs. More specifically, the query is determined by combining multiple cached subgraphs. With respect to CODE 5, the graph server 120 combines cached subgraph associated with CODE 1 that corresponds to the first query for all of the users reporting to Alice and cached subgraph associated with CODE 2 that corresponds to the second query for all of the users working in Alice's building. As such, these two cached subgraphs are combined to answer the query associated with CODE 5.

At OPERATION 450 the new subgraph is cached. With respect to CODE 5, when this previous cached subgraph is expanded, the resulting subgraph, i.e. the nodes corresponding to Alice, her directs and buildings and the edges between them, is cached for future use. According to one aspect the subgraph is cached to the graph server 120 for later access by subsequent queries.

At OPERATION 460, the results of the query are transmitted to the user device 110. In various aspects, the results may be transmitted as a view of the relational graph, a sub-graph, or as another format of data. Method 400 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
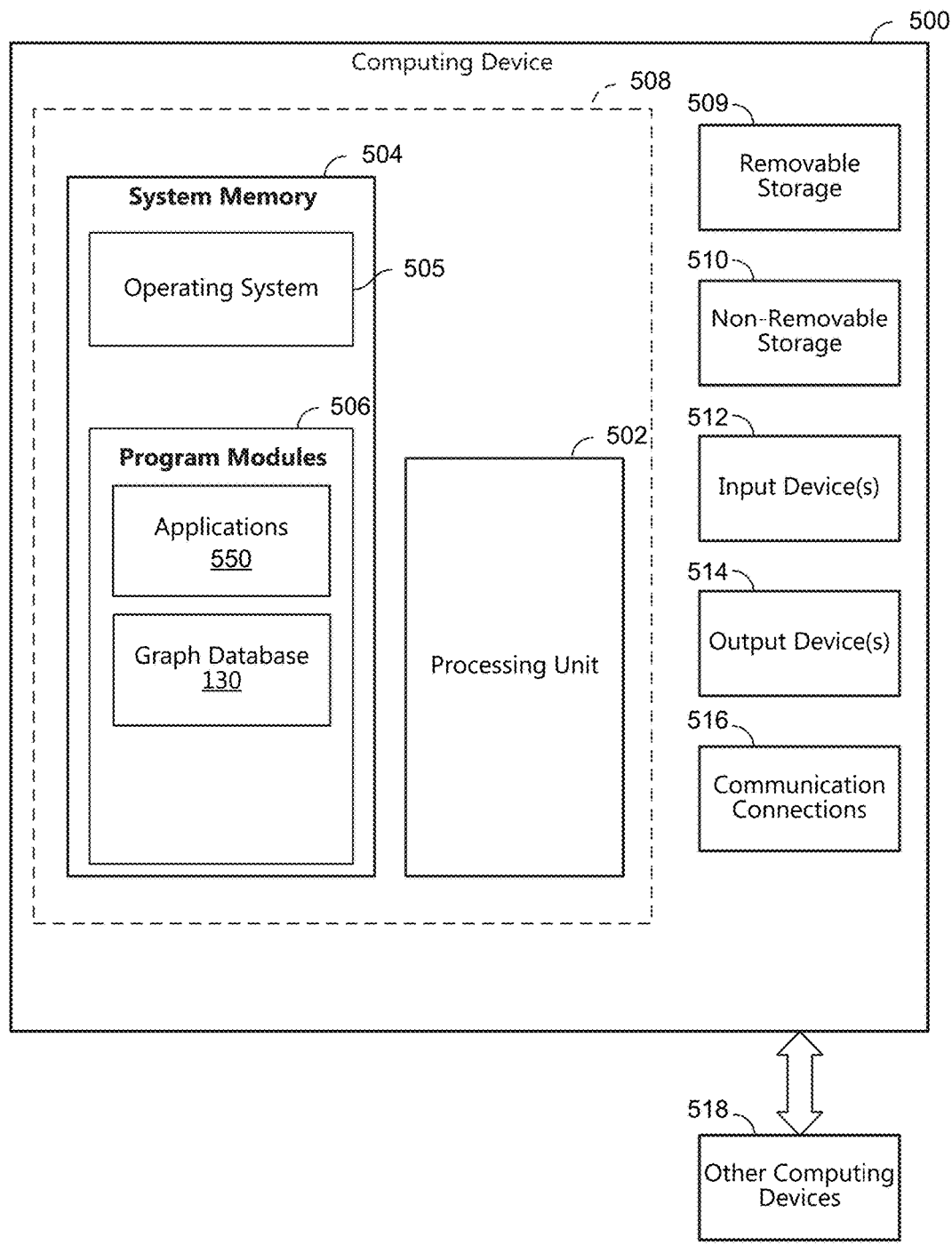
FIG. 5 is a block diagram illustrating example physical components of a computing device.
Figure 6A:
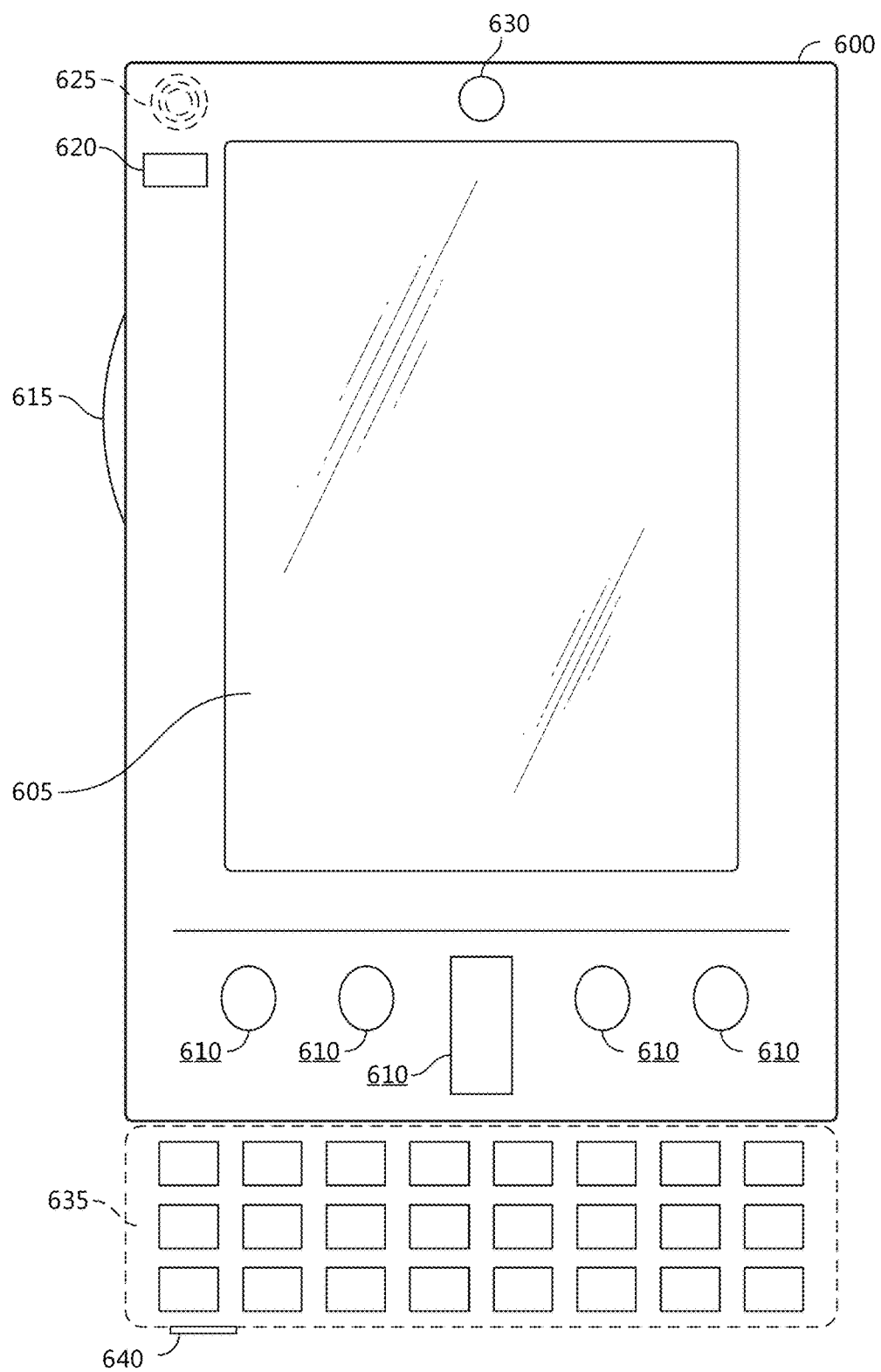
FIGS. 6A and 6B are block diagrams of a mobile computing device.
Figure 6B:
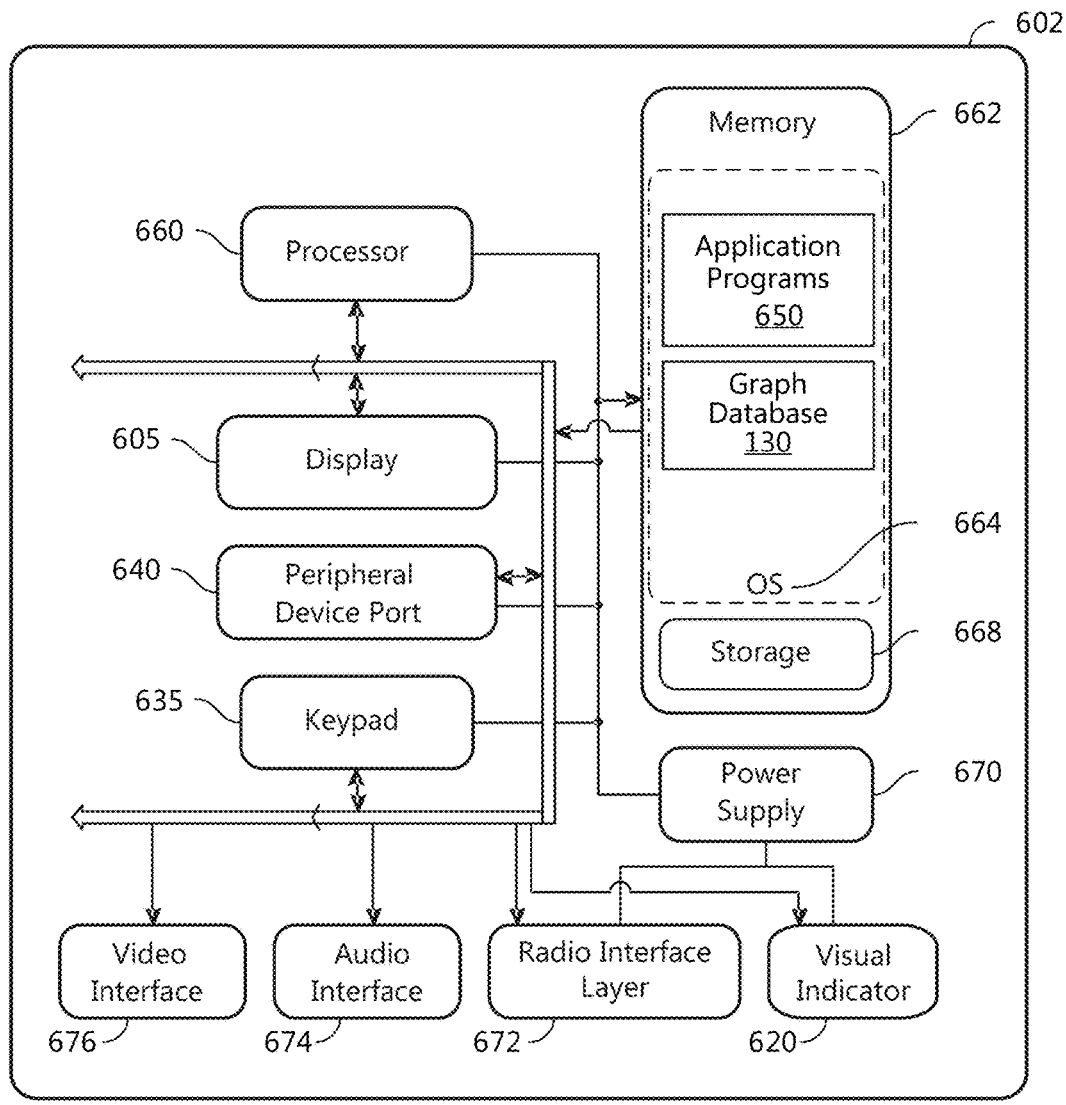
Figure 7:
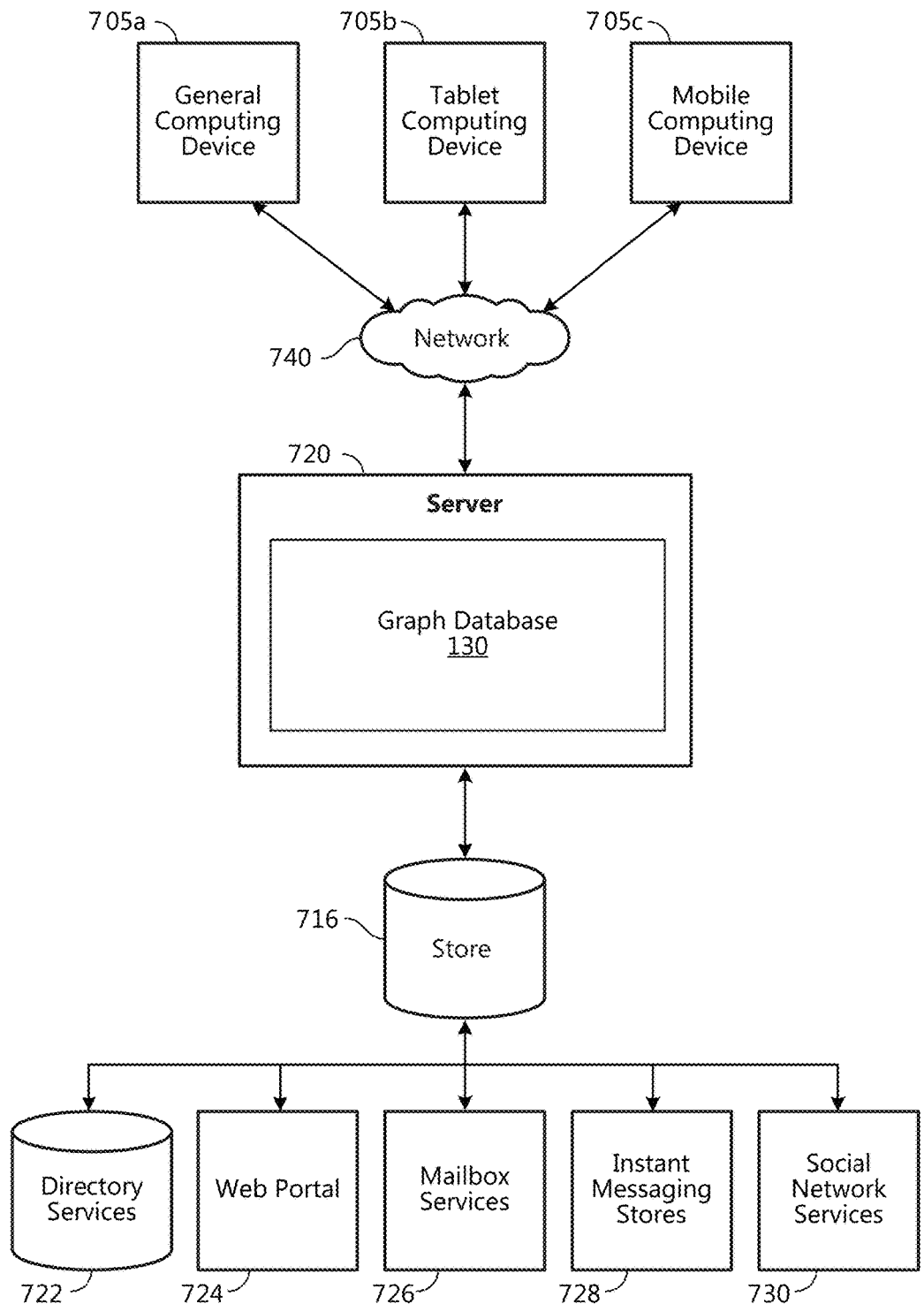
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes graph database 130. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., graph database 130) perform processes including, but not limited to, one or more of the stages of the methods illustrated in FIGS. 2-4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, graph database 130 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for caching subgraphs and integration of cached subgraphs into graph query results as described above. Content developed, interacted with, or edited in association with the graph database 130 is enabled to be stored in different communication channels or other storage types. For example, various documents may be stored using a directory service 722, a web portal 724, a mailbox service 726, an instant messaging store 728, or a social networking site 730. The graph database 130 is operative to use any of these types of systems or the like for caching subgraphs and integration of cached subgraphs into graph query results, as described herein. According to an aspect, a server 720 provides the graph database 130 to clients 705a,b,c. As one example, the server 720 is a web server providing the graph database 130 over the web. The server 720 provides the graph database 130 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for reducing computational resource expenditures by caching subgraphs and integrating the cached subgraphs into graph query results, comprising:
receiving, at a graph server hosting a graph database, a graph query;
querying the graph database according to the graph query;
caching a subgraph, into a subgraph cache, resulting from querying the graph database, wherein the cached subgraph is identifiable by a characteristic associated with the graph query such that the cached subgraph is retrievable for integration into results for a subsequent graph query associated with the characteristic;
transmitting the cached subgraph;
receiving the subsequent graph query;
parsing the subsequent graph query to traverse an Abstract Syntax Tree (AST) associated with the cached subgraph, wherein the AST is a tree representation of an abstract syntactic structure of the cached subgraph, wherein the tree representation has two or more AST levels;
identifying the cached subgraph by the AST level; and
transmitting the cached subgraph in response to the subsequent graph query.

2. The method of claim 1, further comprising receiving the subsequent graph query, wherein the subsequent graph query is a second query received after the graph query.

3. The method of claim 2, further comprising analyzing the subsequent graph query for a subsequent characteristic associated with the subsequent graph query.

4. The method of claim 3, further comprising identifying the cached subgraph, based on the subsequent characteristic being associated with the AST level.

5. The method of claim 4, wherein the cached subgraph is an exact match for the subsequent graph query.

6. The method of claim 4, wherein the cached subgraph represents a portion of a response to the subsequent graph query.

7. The method of claim 2, wherein receiving the subsequent graph query further comprises a first element and a second element.

8. The method of claim 7, wherein the cached subgraph is a partial match for the subsequent graph query.

9. The method of claim 7, further comprising analyzing the subsequent graph query for a first characteristic associated with the first element.

10. The method of claim 9, further comprising identifying the cached subgraph, based on the first characteristic.

11. The method of claim 10, further comprising expanding the cached subgraph based on the second element of the subsequent graph query.

12. The method of claim 11, wherein expanding the cached subgraph based on the second element of the subsequent graph query includes querying the subgraph cache with the second element of the subsequent graph query.

13. The method of claim 10, further comprising identifying a second subgraph, in the subgraph cache, based on a second characteristic associated with the second element.

14. The method of claim 13, further comprising combining the cached subgraph and the second subgraph.

15. The method of claim 14, further comprising caching the combined subgraph.

16. A computer readable storage medium including computer readable instructions, which when executed by a processing unit perform steps for reducing computational resource expenditures by caching subgraphs and integrating the cached subgraphs into graph query results, comprising:
receiving, at a graph server hosting a graph database, a graph query, wherein the graph query includes a first element and a second element;
analyzing the graph query for a characteristic associated with the first element of the graph query;
identifying a subgraph, cached by the graph server, based on the characteristic associated with the first element;
expanding the subgraph based on the second element of the graph query;
caching the expanded subgraph;
transmitting the expanded subgraph;
receiving a subsequent graph query;
parsing the subsequent graph query to traverse an Abstract Syntax Tree (AST) associated with the cached expanded subgraph, wherein the AST is a tree representation of an abstract syntactic structure of the cached expanded subgraph, wherein the tree representation has two or more AST levels;
identifying the expanded cached subgraph by the AST level; and
transmitting the expanded cached subgraph in response to the subsequent graph query.

17. The computer readable storage medium of claim 16, further comprising identifying another subgraph, cached by the graph server, based on the characteristic associated with the second element.

18. The computer readable storage medium of claim 17, wherein expanding the another subgraph based on the second element of the graph query further comprises combining the subgraph and the another subgraph.

19. The computer readable storage medium of claim 16, wherein expanding the subgraph based on the second element of the graph query further includes traversing the subgraph based on the second element of the graph query.

20. A system for reducing computational resource expenditures by caching subgraphs and integrating the cached subgraphs into graph query results, comprising:
a processing unit; and
a memory including computer readable instructions, which when executed by the processing unit, causes the system to be configured to:
receive, at a graph server hosting a graph database, a graph query, wherein the graph query includes a first element and a second element;
analyze the graph query for a characteristic associated with the first element;
identify a first subgraph, cached by the graph server, based on the characteristic associated with the first element;
identify a second subgraph, cached by the graph server, based on the characteristic associated with the second element;
combine the first subgraph and the second subgraph;
cache the combined subgraph;
transmit the combined subgraphs receiving a subsequent graph query;
parsing the subsequent graph query to traverse an Abstract Syntax Tree (AST) associated with the cached expanded subgraph, wherein the AST is a tree representation of an abstract syntactic structure of the cached expanded subgraph, wherein the tree representation has two or more AST levels;
identifying the expanded cached subgraph by the AST level; and
transmitting the expanded cached sub graph in response to the subsequent graph query.

* * * * *